Patented June 17, 1952

2,600,447

UNITED STATES PATENT OFFICE 2,600,447

COPOLYMERS OF ALLYL ESTERS AND MALEATES

William L. Van Horne and La Verne N. Bauer, Philadelphia, and Harry T. Neher, Bristol, Pa., assignors to Rohm & Haas Company, Philadelphia, Pa., a corporation of Delaware No Drawing. Application July 15, 1949, Serial No. 105,047

4 Claims. (Cl. 260—78.5)

This invention relates to oil-soluble copolymers and to compositions which consist essentially of a solution of one or more of these copolymers in a hydrocarbon liquid having a waxy pour point.

The copolymers here claimed are formed from (A) an ester of allyl or methallyl alcohol and a saturated aliphatic monocarboxylic acid having a chain of sixteen to twenty-four carbon atoms and (B) an ester of a saturated aliphatic monohydric alcohol of three to fourteen carbon atoms and maleic, chloromaleic, fumaric, citraconic, or mesaconic acid, the mole ratio of ester A to ester B being from 1:0.25 to 1:$n$, $n$ having a value from one to two, increasing with the size of the alcohol residue in ester B. Thus, $n$ has a value of one for dipropyl esters and increases progressively to a value of two for the dodecyl esters or the myristyl esters.

Oils have been modified in various respects by the addition thereto of resinous materials. For example, resins have been added to oils to improve their body, to improve their temperature-viscosity behavior and/or to change the pour point. Some oil-soluble polymers raise the pour point; others lower the pour point; and some have no effect on this property. The influence of additives on the pour point of wax-containing hydrocarbons has not been predictable.

We have observed that polymers of allyl stearate, allyl palmitate, methallyl laurate, allyl octoate, and allyl isononoate, as specific polymers, do not depress the pour point of typical wax-containing oils and other hydrocarbons. We have found that dipropyl maleate, dibutyl maleate, dibutyl fumarate, dibutyl chloromaleate, dibutyl citraconate, and diamyl maleate are not oil-soluble, while dioctyl maleate, didecyl maleate, dihexadecyl maleate, distearyl maleate, dilauryl citraconate, distearyl citraconate, distearyl fumarate, distearyl mesoconate, distearyl chloromaleate, dipentadecyl maleate, and dihydroabietyl maleate give oil-soluble polymers which fail to depress the pour points of typical wax-containing oils. At the same time, we have prepared some esters of maleic or fumaric acid which were capable of depressing to some extent the pour point of waxy hydrocarbon liquids. Thus, we have noted that some preparations of didodecyl fumarate, didodecyl maleate, and dimyristyl fumarate were capable of depressing the pour points of selected oils. This effect apparently depends upon not only these few particular compositions, but also the particular polymers formed and upon the nature of the oil in which these polymers are placed.

Yet we have found that highly effective and generally useful copolymers can be prepared from allyl esters of higher fatty acids and maleic esters of an extended choice of monohydric alcohols. These new copolymers can be prepared in a wide range of molecular sizes and still exhibit their pour-depressing action. They are effective over a wide range of concentration and in a great variety of oils and other wax-containing hydrocarbons.

The copolymers from allyl esters of higher fatty acids and the specified maleic type esters in the defined proportions are surprisingly different from comparable copolymers from maleic esters with large alcohol residues and allyl esters of lower fatty acids. The former copolymers are more effective than the latter in depressing pour points and in being effective in a wide variety of hydrocarbon liquids. While there are some copolymers of the latter type, such as copolymers of dioctadecyl maleate and allyl laurate in mole ratios of 1:3 to 1:12, which act in paraffinic oils to lower the pour point, they are generally less effective for a given percentage or but slightly effective at comparable economic levels. Furthermore, the latter type of copolymer does not permit much choice of materials with variations in proportions to adapt them to meet varying requirements.

The allyl esters to be here used are prepared by conventional methods. Thus, allyl alcohol or methallyl alcohol and a monocarboxylic acid, as defined, may be heated together in the presence of an esterification catalyst and a solvent which promotes removal of water by azeotropic distillation. Where available, acid anhydrides may be used in place of acids or the reaction may be accomplished with acid halides. Interchange reactions are useful for preparing allylic esters, particularly those from methallyl alcohol.

The allyl and methallyl groups appear quite interchangeable in the copolymers of this invention. In some cases, the methallyl group may impart somewhat greater oil solubility.

As an allylic ester there is used a compound of the formula $$CH_2=C(R^1)CH_2OCOR^2$$

wherein $R^1$ is a methyl group or hydrogen and $R^2$ is an alkyl group having a chain of fifteen to twenty-three carbon atoms. Typical of these esters are allyl palmitate, allyl margarate, allyl stearate, allyl tricosanate, allyl tetracosanate, methallyl palmitate, methallyl stearate, and methallyl tetracosanate. While an ester of a single, pure, long-chained fatty acid may be used, esters of mixed higher fatty acids are likewise useful. Thus fatty acid mixtures of commerce are useful for preparing the allyl esters.

The maleic type esters have the general formula $$ROOCCH{=}C(R^0)COOR$$

where $R^0$ represents hydrogen, the methyl group, or chlorine and R represents an alkyl group of three to fourteen carbon atoms. This formula covers maleic, fumaric, citraconic, mesaconic, and chloromaleic esters. Typical groups for R include propyl, butyl, amyl, hexyl, heptyl, octyl, decyl, dodecyl, and tetradecyl groups. They may be straight or branched. The two R groups may be the same or different. This mixture of alcohols may be used in forming the esters. Similarly, mixtures of esters may be used as well as single pure esters.

The maleic type esters are prepared by known reactions, such as reaction of alcohol and acid, acid anhydride, or acid chloride. Thus, about two molecular proportions of a saturated aliphatic monohydric alcohol of three to fourteen carbon atoms and one molecular proportion of maleic-type acid are heated together in the presence of an acidic condensing agent, such as sulfuric acid. The water of esterification may be removed with the aid of a solvent, such as benzene, toluene, xylene, or a naphtha. Where anhydrides are available, half esters are readily formed by direct reaction with an alcohol and the esterification may be completed by normal esterification procedures.

The preparation of a typical diester of the above type will be given to illustrate a suitable procedure. There were charged to a reaction vessel equipped with stirrer, reflux column, condenser, and water separator 245 parts by weight of maleic anhydride, 930 parts of a commercial dodecyl alcohol, 2.5 parts of sulfuric acid, and 500 parts of benzene. This mixture was heated to reflux temperatures and water was separated from the azeotrope. After 6.5 hours of heating the batch temperature was carried to 106° C. The cooled reaction mixture was washed with a 10% sodium carbonate solution and allowed to form layers, which were separated. The organic layer was divided into two portions. One was stripped by heating to 140° C. under 30 mm. pressure. It yielded 504 parts by weight of didodecyl maleate, which by analysis proved to be 96.7% pure. The other portion was subjected to fractional distillation at low pressure. The fraction obtained at 232°–245° C./1.6 mm. was found to be almost 99% pure didodecyl maleate.

In general the esters having not over twelve carbon atoms in each alcohol residue can be distilled. With longer alkyl groups and advantageously with $C_{10}$ to $C_{12}$ esters, the ester is satisfactorily obtained as a washed and stripped residue. These considerations hold for maleates, fumarates, chloromaleates, citraconates, or mesaconates.

The same sort of procedure utilizing azeotropic distillation is applied to preparation of esters of chloromaleic acid, fumaric acid, and citraconic acid.

For the preparation of copolymers from an allylic ester of a higher fatty acid and a maleic-type ester at least one allylic ester and at least one maleic-type ester are mixed within the proportions stated above. The mixture may be dissolved in an inert organic solvent, such as benzene, toluene, xylene, or naphtha, or solvent may be added during copolymerization. An organic peroxide is added to serve as catalyst. The catalyzed mixture is heated at 70° to 150° C. When the copolymer has been carried to a desired polymer size, heating is discontinued. The solvent may be displaced with a mineral oil by heating the copolymer solution as prepared with such oil under reduced pressure. In this way concentrates of copolymer in oil are prepared which can be added directly to other hydrocarbon liquids.

Useful catalysts include acetyl peroxide, butyryl peroxide, caproyl peroxide, lauroyl peroxide, dibenzoyl peroxide, di-tert.-butyl diperphthalate, tert.-butyl perbenzoate, 2,2-bis(tert.-butylperoxy)butane, methyl ethyl ketone peroxide, di-tert.-butyl peroxide, and tert.-butyl hydroperoxide. One or more of such catalysts may be used in amounts of 2% to 15% or more of the weight of esters to be copolymerized. Increments of catalyst are added to the copolymerizing system from time to time. Copolymerization is usually best started with a low concentration of peroxide, such as 2% to 5%. Added amounts of peroxide promote copolymerization within a reasonable time in good yields.

Use of an inert atmosphere is desirable. This may be obtained by flushing the reaction vessel with an inert gas, such as nitrogen, or by use of a readily volatilized inert organic solvent.

Some typical procedures for preparing the novel and useful copolymers of this invention are presented in the following illustrative examples:

*Example 1*

A reaction vessel was charged with a mixture of 94 parts by weight of allyl tetracosanate, 156 parts of didodecyl fumarate, and 12 parts of benzoyl peroxide. The vessel was swept out with a stream of nitrogen. The mixture was stirred and heated at 100°–116° C. for eight hours. During this time additions of benzoyl peroxide were made as follows:

At 2.25 hours, 5 parts of peroxide;
At 3.33 hours, 12 parts of the peroxide in 150 parts of toluene;
At 4.6 hours, 5 parts of peroxide in 100 parts of toluene;
At 5.67 hours, 2 parts of peroxide;
At 6.75 hours, 2 parts of peroxide; and
At 8 hours, 145 parts of toluene.

The product was a 38.1% solution of copolymer in toluene in a yield of 98.1%.

This copolymer was transferred to a light petroleum oil by mixing 56 parts of the above 38.1% solution with 32 parts of oil and heating. Final stripping of solvent was done at 140° C./15 mm. A conventionally refined Pennsylvania oil of a normal 25° F. pour point was treated with this concentrate to impart 0.04% of copolymer thereto. The pour point was reduced 25° F.

*Example 2*

A mixture was prepared from 53 parts by weight of allyl stearate (distilled at 162° C./0.9 mm. to 172° C./0.2 mm.), 147 parts of didodecyl maleate, and 10 parts of benzoyl peroxide, which was dissolved in the esters by slight warming. This mixture was gradually run into a reaction vessel heated in an oil bath at 118° C. during the course of two hours. At the end of 3 hours 4 parts of benzoyl peroxide was added. After 4.5 hours, the temperature was allowed to drop slowly to about 105° C. At 6.75 hours 4 parts of benzoyl peroxide was added, at 6 hours 2 parts of peroxide in 50 parts of toluene, and at 6.67 hours 2 parts of benzoyl peroxide. At 6.8 hours 135 parts of toluene and at 8 hours 51 parts of toluene were added. The mixture was stirred throughout the process.

The product was a 47.3% solution of copolymer, corresponding to a 96.8% yield. A solution at 30% copolymer in toluene had a viscosity of 63.6 cs. at 100° F. This copolymer has high heat stability and is effective in depressing the pour point of a variety of waxy oils.

*Example 3*

A mixture was prepared from 70 parts of methallyl stearate, 130 parts of didodecyl fumarate, and 10 parts of benzoyl peroxide. This mixture was added to a reaction vessel heated to 114° C. over the course of 1.5 hours. At 2.67 hours 4 parts of benzoyl peroxide and 4 parts of toluene were added and the temperature was maintained at 108°–110° C. until the end of 4.5 hours when it was dropped to 100°–105° C. Additions of peroxide were then made as follows:

At 4.5 hours, 10 parts of benzoyl peroxide in 50 parts of toluene;
At 5.8 hours, 4 parts of benzoyl peroxide; and
At 6.8 hours, 16 parts of toluene in 20 parts of toluene.

Near the end of the eight hour heating period 90 parts of toluene was added. The product was a 46.7% solution of copolymer. The viscosity of a 30% solution of copolymer in toluene was 4 cs. at 100° F.

*Example 4*

A mixture of 50 parts by weight of allyl palmitate, 50 parts of di-n-octyl maleate, and 5 parts of benzoyl peroxide was added to a reaction vessel during the course of about two hours. The reaction vessel was kept at 112°–120° C. The mixture was stirred therein and blanketed with a stream of nitrogen. Additions of the peroxide were made as follows:

At 3 hours, 2 parts;
At 4.5 hours, 5 parts;
At 5.5 hours, 2 parts; and
At 6.5 hours, 0.8 parts in 10 parts of toluene.

At 7.5 hours, 99 parts of toluene was added and heating was discontinued at 7.7 hours. The product was a 45% solution fo copolymer in toluene, corresponding to a yield of 94%. The viscosity of a 30% solution of copolymer in toluene was 26.4 cs. at 100° F. This is a most effective pour point depressant in all types of waxy oils.

*Example 5*

There were mixed 20.8 parts of methallyl stearate and 9.2 parts of diisopropyl maleate and 1.5 parts of benzoyl peroxide was dissolved therein by gentle warming. This mixture was heated at 113°–115° C. under a nitrogen atmosphere. After copolymerization had begun, small amounts of benzoyl peroxide were added from time to time and when the batch began to thicken small amounts of toluene were added. In all 4.45 parts of the peroxide catalyst were added and 8.7 parts of toluene. The time of copolymerization was eight hours. The product contained 74.9% of copolymer in a 94.8% yield.

*Example 6*

(a) There were mixed 30 parts of allyl palmitate, 70 parts of dimyristyl maleate, and 5 parts of benzoyl peroxide. The mixture was heated at 111°–115° C. until copolymerization was well started and then at 95°–105° C. until the end of an eight hour period. During the course of copolymerization, there was added additional benzoyl peroxide amounting to 9.8 parts and toluene amounting in all to 100 parts. The product was a 45.8% solution of the copolymer in a yield of 92%. A 30% solution of this copolymer in toluene had a viscosity of 5.1 cs. at 100° F.

(b) A mixture of 28 parts of allyl palmitate, 72 parts of dimyristyl maleate, and 5 parts of benzoyl peroxide was heated under a nitrogen atmosphere at 118°–119° C. until copolymerization was well advanced and then at 95°–102° C. until 8.25 hours had elapsed. Occasional additions of benzoyl peroxide amounted to 9.8 parts and 100 parts of toluene was added. The product was a 49.8% solution of copolymer, corresponding to a yield of 95%. A 30% solution of the copolymer in toluene had a viscosity of 44.8 cs. at 100° F.

*Example 7*

There were mixed 65 parts of allyl palmitate, 35 parts of di-2-ethylhexyl fumarate and 5 parts of benzoyl peroxide. Copolymerization was effected by heating this mixture under nitrogen initially at 118° C. and then at 95°–105° C. Additional peroxide added from time to time amounted to 9.8 parts while toluene was added in an amount of 100 parts. The product was a 46.4% solution. A 30% solution of the copolymer in toluene had a viscosity of 5.5 cs. at 100° F.

*Example 8*

(a) Copolymerization was effected in accordance with previous examples with allyl palmitate and dicapryl maleate in a 1:0.872 mole ratio. The product was a 45.6% solution of copolymer. A 30% solution of the copolymer in toluene had a viscosity of 41 cs. at 100° F.

(b) A similar copolymer was made from allyl palmitate and di-n-octyl maleate in a 1:0.87 mole ratio. Time of copolymerization was 7.6 hours with temperatures at the start of 115°–120° C. and at 100°–108° C. after the first two hours. The product was a 45.2% solution of copolymer in a 94% yield. A 30% solution had a viscosity of 26.4 cs. at 100° F.

*Example 9*

A mixture of 66.6 parts of allyl stearate, 133.4 parts of didodecyl chloromaleate, and 10 parts of benzoyl peroxide was heated at 121° C. under nitrogen until copolymerization was well started. The temperature was then gradually decreased to 100° C. Total time of copolymerization was 7.5 hours. Additional quantities of benzoyl peroxide were introduced from time to time in a total of 19.6 parts. The reaction mixture was kept fluid by addition of 200 parts of toluene. The product was a 44.8% solution of copolymer in a yield of 93.5%. A 30% solution of copolymer in toluene had a viscosity of 3.2 cs. at 100° F.

*Example 10*

A mixture of 70 parts of allyl stearate, 130 parts of didodecyl citraconate, and 10 parts of benzoyl peroxide was heated to 113°–118° C. until copolymerization was well started and then at 98°–107° C. for 7.6 hours. There were added 19.6 parts of benzoyl peroxide and 250 parts of toluene as in previous preparations. The product was a 39.4% solution of copolymer in a yield of 91%. A 30% solution had a viscosity of 2.5 cs. at 100° F.

Use of didodecyl mesaconate for the citraconate leads to a product having similar properties.

*Example 11*

The procedures used above were applied to a mixture of 70 parts of allyl stearate, 130 parts of didodecyl maleate, and 7.66 parts of tert.-butyl perbenzoate. Copolymerization was started with temperatures of 114°–120° C. and continued at 98°–103° C. during a period of 7.5 hours. Increments of the peroxide amounted to 15 parts and 250 parts of toluene were added during the copolymerization. The product was a 43.5% solution of the copolymer in a 93.6% yield. A 30% solution of the copolymer in toluene had a viscosity of 35 cs. at 100° F.

The pour point depressing action of the above and other copolymers of the type herein defined was observed by dissolving them in typical petroleum oils and determining the pour points of the resulting solutions. Usually the standard A. S. T. M. pour test was made (D97–47). It was supplemented from time to time with maximum pour tests and with shock chilling. The maximum pour test is described in Proc. A. S. T. M. 45, appendix I, p. 245 (1945). The shock chilling determination is made by observing the sample during the initial cooling step with the cooling jacket at −60° F.

As test oils there were used three different oils. Oil I was a 150 Pennsylvania neutral having a pour point of +25° F. and a viscosity index of 106.9. Oil II was an S. A. E. 90 gear oil compounded from 30 parts of a 180 Pennsylvania neutral and 70 parts of a 150 Pennsylvania bright stock. It had a pour point of +25° F. A third oil used (oil III) was a 500 Mid-Continent solvent-extracted neutral, S. A. E. 30, having a pour point of 25° F. This was known to be an oil which was not readily changed as to its pour point. The response of these oils to various copolymers of this invention is summarized below.

A copolymer from allyl palmitate and di-n-propyl maleate in a 1:0.8 mole ratio, giving a viscosity of 5.2 cs. at 100° F. to a 30% solution in toluene, was dissolved in oil I. At 0.5% it gave a pour point of −15° F. and at 0.25% −5° F. In oil III at 0.5% it gave a pour point by shock chilling of −10° F. In oil II at 0.04% it gave a pour point of 20° F.

A copolymer from allyl palmitate and di-n-propyl maleate in a 1:0.5 ratio gave pour points of 0° F. at 0.5% ant 0.25% in oil I and at 0.5% in oil III of −10° F. by shock chilling.

A copolymer from the same esters but in a 1:0.25 mole ratio gave a pour point at 0.5% in oil I of 5° F.

Copolymers were made with allyl palmitate and dibutyl maleate in ratios of 1:1.1, 1:0.75, and 1:0.43. At 0.5% in oil I pour points of −10° F., −20° F., and −10° F. respectively were found. The 1:1.1 copolymer fell off rapidly in effectiveness as concentration in oil was decreased. The other two copolymers persisted in their pour depressing action at 0.1%.

A copolymer from allyl palmitate and diisobutyl maleate in a 1:0.75 mole ratio at 0.5% and 0.25% in oil I gave pour points of −20° F. In oil III at 0.5% the pour point found by shock chilling was −20° F. A copolymer in a mole ration of 1:3 was ineffective, the pour point at 0.5% in oil I being +30° F.

A copolymer from allyl palmitate and dicapryl maleate in a 1:0.9 mole ratio, a 30% solution of this copolymer in toluene having a viscosity of 41 cs. at 100° F., was tested in oil I. At 0.5% it gave a pour point of −30° F. and in oil III it gave a pour point by shock chilling of −5° F.

A similar copolymer from allyl palmitate and di-2-ethylhexyl fumarate in a 1:1 ratio gave a pour point of −30° F. at 0.5% in oil I.

A copolymer from allyl palmitate and di-n-octyl maleate, in a mole ratio of 1:0.9, a 30% solution thereof in toluene having a viscosity of 26.4 cs. at 100° F., gave a pour point of −35° F. in oil I at 0.5% and of −20° F. at 0.25%. In oil III at 0.5% it gave a pour point of −10° F. by shock chilling.

A copolymer of allyl palmitate and dimyristyl maleate in a mole ration of 1:1.5, a 30% solution thereof in toluene having a viscosity of 44.8 cs. at 100° F., gave pour points of −10° F. at 0.5% and 0.25%. In oil III at 0.5% it gave a pour point of 5° F. by shock chilling.

A copolymer from allyl stearate and di-n-octyl maleate in a ratio of 1:1 gave pour points of −20° F. at 0.5% and 0.25% in oil I. A copolymer from these same monomers but in a 1:0.2 mole ratio gave a pour point of 5° F. at 0.5% and was ineffective at 0.25%. A copolymer from these monomers at a 1:4 mole ratio gave a pour point of 30° F. at 0.5% in oil I. A copolymer at 1:1.5 gave a pour point of 0° F. at 0.5% in oil I, but lost effectiveness with much lower concentrations. Thus, the mole ratios of allyl ester to octyl ester lie between the values 1:0.25 and 1:1.5.

A copolymer from allyl stearate and didodecyl maleate in a 1:2 mole ratio, a 30% solution thereof in toluene having a viscosity of 64 cs. at 100° F., at 0.5% in oil I gave a pour point of −30° F., at 0.1% of −25° F. and at 0.04% of −15° F. In oil II at 0.1% it depressed the pour point to 5° F. In oil III at 0.5% it gave a pour point by the maximum pour method of −10° F.

A copolymer of allyl stearate and didodecyl maleate in a ratio of 1:1.44 gave pour points in oil I of −25° F. at 0.5% and 0.25% and −20° F. at 0.1% and 0.04%. In oil II at 0.1% the pour point was −10° F. In oil III at 0.5% the pour point was −5° F. by the maximum pour method.

Essentially the same pour points were observed with copolymers from the same monomers in a 1:1.33 mole ratio catalyzed with benzoyl peroxide, tert.-butyl perbenzoate, and lauroyl peroxide respectively. One of the copolymers with a 1:1.33 mole ratio, a 30% toluene solution of which gave a viscosity of 64.9 cs. at 100° F., was dissolved at 0.5% and 2% in oil I and the viscosities of these solutions determined at 100° F. and 210° F. and therefrom the viscosity index was calculated. The oil itself had a viscosity index of 106.9. The 0.5% solution had an index of 109.2, while the 2% solution had an index of 120.3.

A 0.5% solution of polyallyl stearate in oil I had a pour point of 30° F. A 0.5% solution of a polymer of didodecyl maleate was likewise 30° F. A mechanical mixture of the two individual polymers were made in a 1:1.33 mole ratio. At 0.5% of the mixture in oil a pour point of 20° F. was found.

A copolymer was prepared from allyl stearate and didodecyl monochloromaleate in a 1:1.33 mole ratio. Its 30% solution in toluene had a viscosity of 3.2 cs. at 100° F. At 0.5% in oil I it depressed the pour point to −40° F. In oil III at 0.5% it gave a pour point by shock chilling of −10° F.

A copolymer prepared from allyl tetracosanate and didodecyl maleate in a 1:1.5 mole ratio gave pour points at 0.5% in oil I and oil III of 0° F.

A copolymer from methallyl stearate and diisopropyl maleate in a 1:0.75 mole ratio depressed the pour point of oil I at 0.5% to 10° F. A copolymer from methallyl stearate and di-n-hexyl maleate at 1:0.25 mole ratio depressed the pour point of oil I to 0° F. when present at 0.5% and to −5° F. when present at 0.25%.

A copolymer from allyl palmitate and di-2-ethylhexyl fumarate in a 1:0.5 mole ratio depressed the pour point of oil I to −25° F. when used at 0.5%. At 0.1% in oil I the depressed pour point was −10° F. In oil III at 0.5% the pour point was −15° F. by shock chilling. In oil II the pour point was 5° F. at 0.1%.

A copolymer from allyl stearate and di-n-butyl fumarate in a 1:0.75 mole ratio was effective in reducing the pour point of oil I to −20° F. at 0.5% and 0.25%. In oil III at 0.5% it gave a pour point of −5° F.

A copolymer from allyl stearate and didodecyl fumarate in a 1:1.33 mole ratio gave at 0.5% in oil I a pour point of −20° F., at 0.1% −15° F., and at 0.04% −10° F.

A copolymer from allyl tetracosanate and didodecyl fumarate in a mole ratio of 1:1.5 gave a pour point of 0° F. at 0.1% and 0.04% in oil I.

A copolymer from methallyl stearate and didodecyl fumarate gave pour points of −20° F. at 0.5%, 0.25%, and 0.1% in oil I and −20° F. at 0.5% in oil III by shock chilling.

A copolymer from allyl palmitate and di-n-butyl citraconate in a 1:0.5 mole ratio gave a pour point of −10° F. at 0.5% in oil I. A copolymer from the same monomers, but in a 1:1.1 mole ratio, gave a pour point of 15° F. at 0.5% in oil I.

A copolymer of allyl stearate and didodecyl citraconate in a 1:1.3 mole ratio gave a pour point of −35° F. in oil I at 0.5% and of −20° F. in oil I at 0.25%. In oil III at 0.5% it depressed the pour point to −20° F. under shock chilling.

The percentage of copolymer which may be dissolved in a hydrocarbon liquid having a waxy pour point is an amount sufficient to depress the pour point thereof and varies from about 0.01% to 5% by weight of the composition. The percentage chosen will depend upon the particular copolymer, the nature of the hydrocarbon fluid, and the end or ends to be accomplished. When viscosity is to be increased, copolymers of high molecular weight and/or increased amounts of copolymer will be desired. The apparent molecular weights of these copolymers can be varied from about 1,000 to 50,000.

The copolymers are stable under the usual conditions encountered with hydrocarbon liquids. They are useful in lubricating oils and also in other fluids, such as fuel oils and diesel fuels and do not interfere with the normal functioning of such liquids. Furtherfore, they are compatible with other additives, such as antioxidants, wear-resisting agents, detergents and the like.

We claim:

1. An oil-soluble copolymer from (A) an ester of an alkanoic acid having a chain of sixteen to twenty-four carbon atoms and an alcohol selected from the class consisting of allyl and methallyl alcohols and (B) an ester of a saturated aliphatic monohydric alcohol of three to fourteen carbon atoms and a dibasic acid of the formula $$HOOCCH = C(R^0)COOH$$

wherein $R^0$ is a member of the class consisting of hydrogen, chlorine, and the methyl group, the mole ratio of the ester group (A) to the ester group (B) being 1:0.25 to 1:$n$, where $n$ has a value of one when the alcohol group has three carbon atoms and increases with the size of such group up to two when the alcohol group has fourteen carbon atoms.

2. An oil-soluble copolymer from allyl stearate and di-n-octyl maleate, the mole ratio of stearate groups to maleate groups being between 1:0.25 and 1:1.5.

3. An oil-soluble copolymer from allyl palmitate and didodecyl maleate, the mole ratio of stearate groups to maleate groups being between 1:0.25 and about 1:2.

4. An oil-soluble copolymer from methallyl stearate and didodecyl fumarate, the mole ratio of stearate groups to fumarate groups being between 1:0.25 and about 1:2.

WILLIAM L. VAN HORNE.
LA VERNE N. BAUER.
HARRY T. NEHER.

REFERENCES CITED

The following references are of record in the file of this patent:

UNITED STATES PATENTS

| Number | Name | Date |
|---|---|---|
| 2,374,081 | Dean | Apr. 17, 1945 |
| 2,431,374 | D'Alelio | Nov. 25, 1947 |
| 2,437,962 | Kropa | Mar. 16, 1948 |
| 2,441,023 | Larsen | May 4, 1943 |
| 2,460,035 | Rogers et al. | Jan. 25, 1949 |
| 2,509,203 | Bartlett | May 30, 1950 |
| 2,533,376 | Jones | Dec. 12, 1950 |

OTHER REFERENCES

"Allyl Alcohol," by Shell Devel., 1946, p. 27 pertinent.